(12) United States Patent
Miller

(10) Patent No.: X2258
(45) Date of Patent: Jan. 25, 1815

(54) PAINT, BROWN

(76) Inventor: Thomas Miller Jr.

Thomas Millen jun.

Letters Patent,

The Schedule referred to in these Letters Patent and making part of the same containing a description in the words of the said Thomas Millen Junr. himself of his manufacturing Brown Paint.

The paint in its crude state, resembles stone and is an earthly substance. It is found in veins below the surface of the earth on the banks of the Oriskany Creek and also on the banks of other creeks in Oneida County and in other places in the State of New York, when first dug from the ground the mass adheres firmly together but after remain being exposed to the air for a time the particles gradually crumble off from the mass without any external pressure. The colour is of a light chocolate brown with a purple shade. The shades of Colour vary in the same vein & it appears uniformally darker in the lump than when pulverized.

The method of manufacturing it, is by drying the substance in an oven and then grinding it, or pulverizing it in some other manner. It mixes readily with oil and forms a bright colour Witnesses  Thomas Millen jun.

John Lucas

Samuel Goodwin (210 words)

Exd WG.